(12) United States Patent
Godley et al.

(10) Patent No.: US 9,930,543 B2
(45) Date of Patent: Mar. 27, 2018

(54) OPTIMIZING MOBILE NETWORK BANDWIDTH

(71) Applicant: Parallel Limited, Cranfield (GB)

(72) Inventors: Michael Godley, County Kerry (IE); Richard Lord, County Cork (IE); Edmond Higgins, County Cork (IE); QiMing Zhu, Palo Alto, CA (US); Siu Bun Chan, Hong Kong (CN); Ian Walter, Vienna, VA (US)

(73) Assignee: Parallel Limited, Cranfield (GB)

( * ) Notice: Subject to any disclaimer, the term of this patent is extended or adjusted under 35 U.S.C. 154(b) by 386 days.

(21) Appl. No.: 14/398,819

(22) PCT Filed: May 1, 2013

(86) PCT No.: PCT/EP2013/059076
§ 371 (c)(1),
(2) Date: Nov. 4, 2014

(87) PCT Pub. No.: WO2013/164378
PCT Pub. Date: Nov. 7, 2013

(65) Prior Publication Data
US 2015/0117349 A1 Apr. 30, 2015

Related U.S. Application Data

(60) Provisional application No. 61/642,612, filed on May 4, 2012.

(51) Int. Cl.
*H04W 24/02* (2009.01)
*H03M 7/30* (2006.01)
(Continued)

(52) U.S. Cl.
CPC ............ *H04W 24/02* (2013.01); *H03M 7/30* (2013.01); *H04L 29/0604* (2013.01);
(Continued)

(58) Field of Classification Search
CPC ..... H04W 24/02; H04W 72/04; H04W 88/16; H04W 12/02; H04W 28/06; H04L 72/04;
(Continued)

(56) References Cited

U.S. PATENT DOCUMENTS

2001/0053145 A1 12/2001 Willars et al.
2009/0220080 A1* 9/2009 Herne ................ H04L 63/0428
380/255
(Continued)

OTHER PUBLICATIONS

European Search Report dated Jul. 28, 2017, issued in European Patent Application No. 13719852.9.

*Primary Examiner* — Kwang B Yao
*Assistant Examiner* — Moo Ryong Jeong
(74) *Attorney, Agent, or Firm* — Oblon, McClelland, Maier & Neustadt, L.L.P.

(57) ABSTRACT

A gateway turns encrypted PS data traffic on the Iub interface into clear IP packets so that WAN stream de-duplication and other optimization can be performed to eliminate the transfer of repetitive data across the Iub interface, thereby increasing the throughput between the NodeB and the RNC of the WCDMA network. The gateway pulls PS data traffic out from Iub without disturbing the signaling and CS traffic. The bifurcated PS data traffic is redirected to the GTP I/O port of the gateway where the stream de-duplication is applied. Deployment of the gateway is transparent to the WCDMA network. No network reconfiguration is required to deploy the gateway on the Iub interface.

37 Claims, 10 Drawing Sheets

Iub Gateway creates a 'clear' GTP port on the Iub interface for data optimization

(51) Int. Cl.
   *H04W 28/06* (2009.01)
   *H04L 29/06* (2006.01)
   *H04W 72/04* (2009.01)
   *H04W 88/16* (2009.01)
   *H04L 29/08* (2006.01)
   *H04W 12/02* (2009.01)

(52) U.S. Cl.
   CPC ........ *H04L 65/403* (2013.01); *H04L 65/4015* (2013.01); *H04L 67/2828* (2013.01); *H04L 69/04* (2013.01); *H04W 28/06* (2013.01); *H04W 72/04* (2013.01); *H04W 88/16* (2013.01); *H04L 63/0428* (2013.01); *H04L 63/164* (2013.01); *H04W 12/02* (2013.01)

(58) Field of Classification Search
   CPC ............... H04L 65/4015; H04L 65/403; H04L 67/2828; H04L 69/04; H04L 63/0428; H04L 63/164; H04L 29/0604; H03M 7/30
   See application file for complete search history.

(56) References Cited

U.S. PATENT DOCUMENTS

| | | | |
|---|---|---|---|
| 2010/0098092 A1* | 4/2010 | Luo | H04L 12/24 370/401 |
| 2011/0170477 A1* | 7/2011 | Cao | H04W 4/18 370/328 |
| 2012/0106413 A1* | 5/2012 | Huang | H04L 1/0079 370/310 |
| 2013/0219008 A1* | 8/2013 | Zhou | H04L 67/2842 709/216 |

* cited by examiner

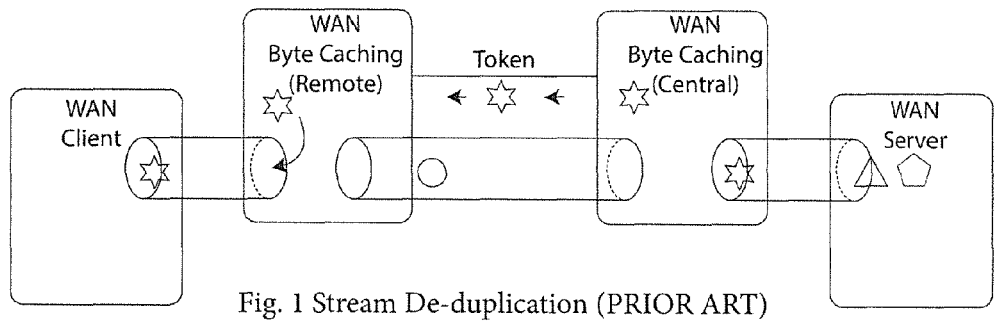
Fig. 1 Stream De-duplication (PRIOR ART)
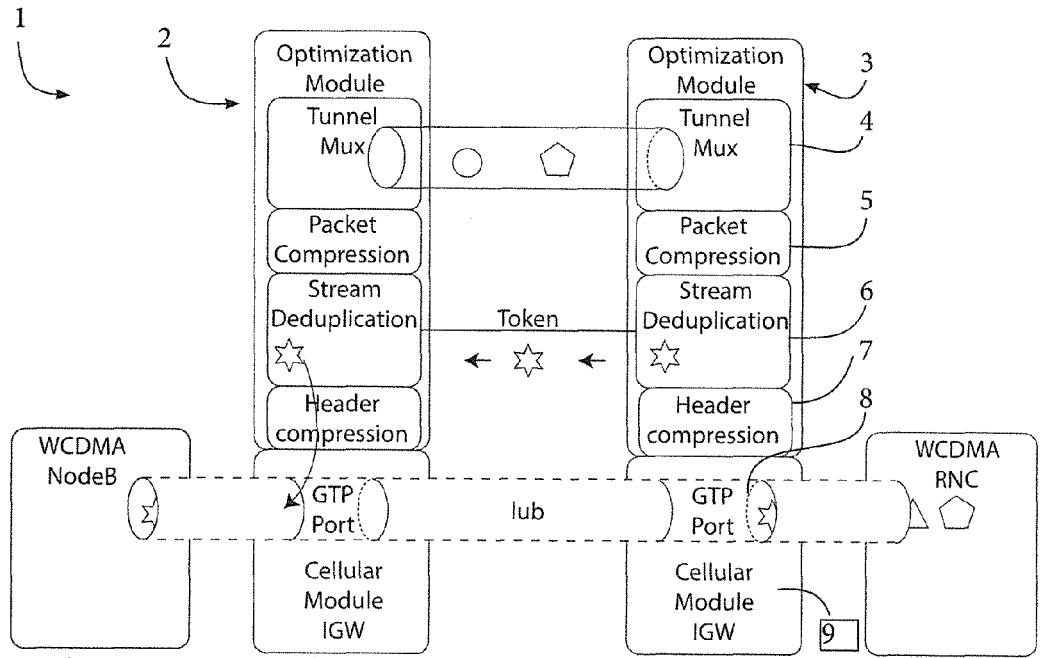
Iub Gateway creates a 'clear' GTP port on the Iub interface for data optimization
Fig. 2
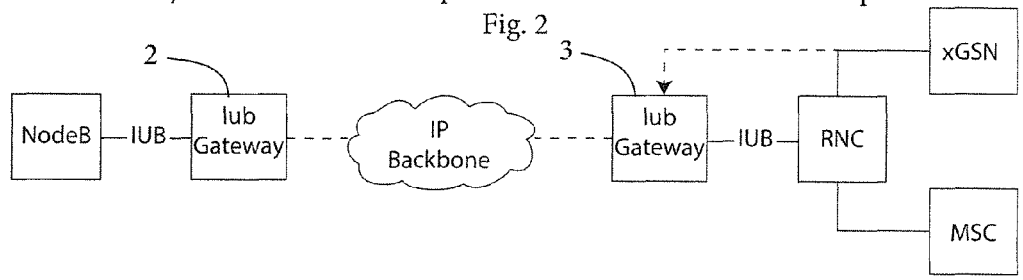
Symmetrical UrbanDate Iub Optimizer Gateway architecture
Fig. 3

Symmetrical UrbanDate Iub Optimizer Gateway architecture

Iub Optimization via Iub Gateway

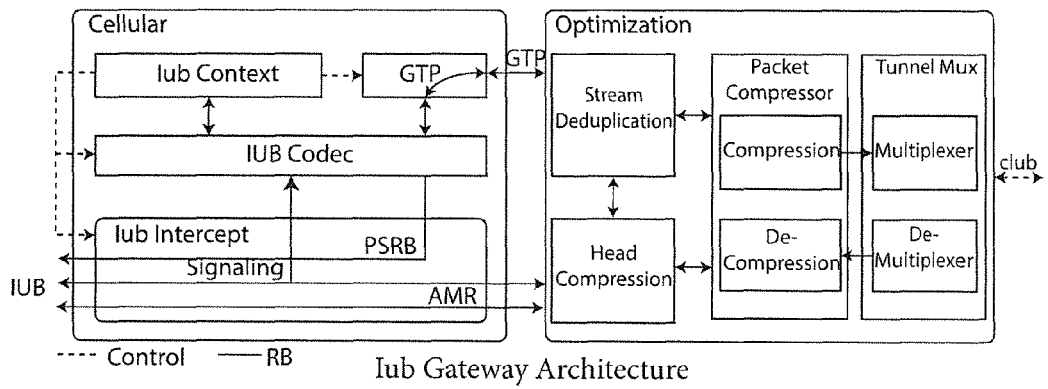
Iub Gateway Architecture
Fig. 7
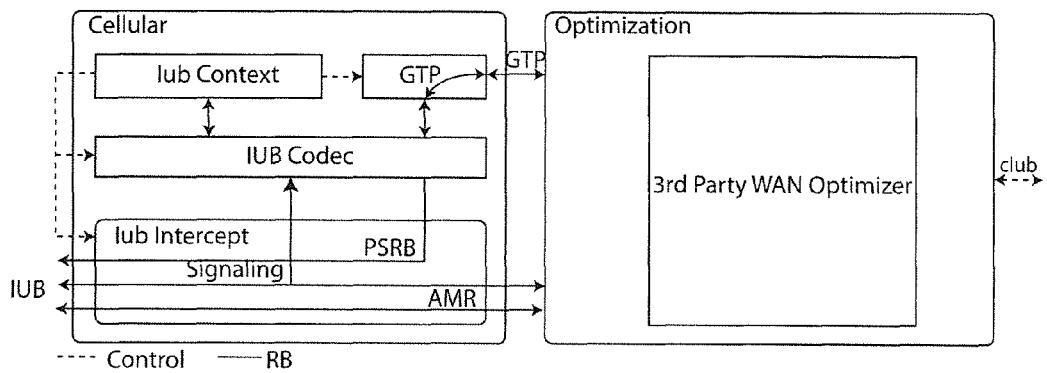
Iub Gateway with 3rd Party WAN Optimizer
Fig. 8
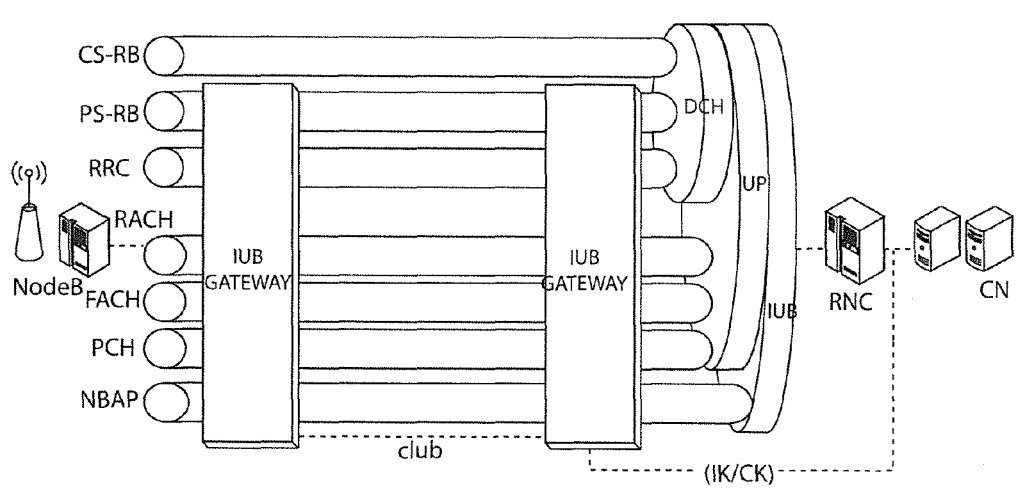
Club Channels     Fig. 9

IGW Common Channel Identity from Cell Setup

IGW intercepts RRC/NBAP signaling and builds context

Iub Gateway ciphering suppression

Iub Gateway GTP conversion

Iub Gateway Intercepter

Iub Gateway Bandwidth Optimization

OPTIMIZING MOBILE NETWORK BANDWIDTH

FIELD OF THE INVENTION

The invention relates to mobile networks, and particularly to reducing the extent of bandwidth required for data traffic.

PRIOR ART DISCUSSION

According to the Global mobile Suppliers Association (GSA) survey, 99% of WCDMA operators have evolved their networks to HSPA—High Speed Packet Access, for delivering mobile broadband services. HSPA has brought the fixed broadband experience to mobile subscribers and extending wireless connectivity into new applications and environments. The rapidly growing smartphone segment and widespread market acceptance of dongles, HSPA-enabled PCs/notebooks has pushed data consumption to unprecedented levels. Data traffic has passed voice traffic on many networks. The transition to HSPA evolution result in further growth, creating greater numbers of end users accessing true broadband speeds and advanced services via their smart mobile devices. The data rate is often limited by the Iub (Interface UMTS connection RNC and NodeB) interface that connects the NodeB with the RNC. Iub becomes the bottleneck of the WCDMA mobile data traffic.

As shown in FIG. 1 stream de-duplication is a WAN technology that reduces the amount of data traversing the network by replacing repetitive streams of raw application data with shorter "tokens" prior to transmission over the network. Reducing the amount of data traversing the WAN not only reduces bandwidth consumption, but also reduces the impact of latency due to network congestion and increases application throughput. Stream de-duplication can increase application throughput substantially under the right circumstances.

However, Stream de-duplication is performed on clear IP traffic, and can not be applied directly to the Iub interface, as the Iub data payload is encrypted and Iub protocol is nontrivial to the stream de-duplication software. The Iub interface is opaque to the WAN stream de-duplication optimizer.

The invention is therefore directed towards achieving a significant reduction in data traffic where an Iub or equivalent interface is used.

GLOSSARY

AM Acknowledge Mode
AMR Adaptive Multi-Rate speech codec
ATM Asynchronous Transfer Mode
AWE Arrival Window End
AWS Arrival Window Start
CCCH Common Control Channel
CCH Control Channel
CFN Connection Frame Number
cIub Compressed Iub
CK Cipher Key
CN Core Network
CS Circuit Switched service
DATE Date At The Edge
DCH Dedicated Channel
E-DCH Enhanced Dedicated Channel
FACH Forward Access Channel
FDD Frequency Division Duplex
FP Frame Protocol
FP Finger Printer
GGSN GPRS Gateway GPRS Service Node
GTP GPRS Tunnelling Protocol
HC Header Compression
HSDPA/HDUPA High Speed Downlink Packet Access/High Speed Uplink Packet Access
IGW IUB Gateway
IK Integrity Key
IU Interface UMTS
IUB or Iub Interface UMTS connection RNC and NodeB
LC Logical Channel
MAC Medium Access Control
MSC Mobile Switch Centre
NBAP NodeB Application Part
NE Network Element
PCH Paging Channel
PDCP Packet Data Convergence Protocol
PS Packet Switched service
PSRB PS Radio Bearer
RB Radio Bearer
RACH Random Access Channel
RAN Radio Access Network
RB/SRB Radio Bearer/Signalling Radio Bearer
RLC Radio Link Control
RNC Radio Network Controller
RRC Radio Resource Control
SDU Service Data Unit
SGSN GPRS Serving Service Node
SRB Signalling Radio Bearer
SRNC/CRNC Serving RNC/Control RNC
TC Traffic Channel
TCP Transmit Carrier Power
TDD Time Division Duplex
TEID Tunnel Endpoint Identifier
TPS Transport Format Set
TM Transparent Mode
TTI Transport Time Interval
UE User Equipment
UEA UMTS encryption algorithm
UTA UMTS Integrity algorithm
UL/DL Uplink/Downlink
UM Unacknowledged Mode
UMTS Universal Mobile Telecommunications System
UTRAN Universal Terrestrial Radio Access Network
WAN Wide Area Network
xGSN GGSN/SGSN

SUMMARY OF THE INVENTION

According to the invention, there is provided a gateway comprising digital data processors and communication links adapted to provide:
 a central module for interfacing with a core network element;
 a remote module for interfacing with a remote base station;
 wherein said modules are adapted to provide communication between the core network element and the remote base station, in which the modules are adapted to perform the following for each direction:
  detect data and signalling channels;
  extract data traffic without affecting signalling, and decrypt the portion of the data traffic which had been encrypted;

perform conversion of the data traffic to a format suitable for optimization to reduce bandwidth required, perform said optimization, and transmit the optimized data; and receive optimized data from the other module and re-constitute the original encrypted data channel.

In one embodiment, the conversion is performed transparently to the core network element and to the remote base station. In one embodiment, the modules are adapted to detect data and voice channels and to perform different actions on them. In one embodiment, the modules are adapted to allow voice pass through with no conversion or optimisation, while diverting data streams for conversion and optimization.

In one embodiment, data streams are encapsulated into a tunnelling protocol and are processed by optimization functions to reduce bandwidth. In one embodiment, the channel detection is performed by a package switch radio bearer function.

In one embodiment, the signalling traffic is transmitted on an IUB interface. In one embodiment, the core network element is an RNC. In one embodiment, the remote base station is a NodeB.

In one embodiment, the modules include tunnel multiplexer functions to optimize the data streams.

In one embodiment, the system comprises greater than two modules, and there is a many-to-one relationship between remote modules and each central module.

In one embodiment, the encrypted data is extracted to clear packets suitable for stream de-duplication. Preferably, the clear packets from the stream de-duplication are re-encrypted and inserted back on to the interface In one embodiment, at least one module comprises, from top down, software for tunnel multiplexing, packet compression, stream de-duplication, and header compression. In one embodiment, the modules are adapted to monitor signalling and to establish a conversion context in real time according to the monitored signalling.

In one embodiment, the modules maintain in real time tables for controlling how interface stream detection and conversion are performed.

In one embodiment, at least one module is adapted to communicate with elements external to the interface in order to determine information for conversion.

In one embodiment, at least one module is adapted to communicate with a core network element on a side opposed to the interface. Preferably, the module is adapted to retrieve a key from the IU interface on a core network element such as an RNC in order to establish a context. In one embodiment, a module is adapted to obtain a CMD ID and a SEC M CMD.

In one embodiment, the modules are adapted to suppress ciphering according to monitoring of signalling on the interface. Preferably, the modules are adapted to monitor protocol headers for conversion to a desired protocol such as a tunnelling protocol.

In one embodiment, the modules are adapted to convert headers to session ID format for bandwidth optimization. In one embodiment, the interface includes an LTE capability.

In one embodiment, the modules are similar in capability, differing substantively only in capacity, providing a symmetrical architecture.

In one embodiment, at least one module is adapted to perform spoofing, by not sending some packets and equivalent packets being generated by the other module. Preferably, said packets are empty FP packets.

In one embodiment, the modules are adapted to perform latency tolerance operations.

In one embodiment, the modules are adapted to delay channel synchronisation signals to maintain overall frame synchronisation even where the modules may themselves introduce additional latency and jitter. In one embodiment, the channel delay measurement signals are delayed by to increase the latency as perceived by the sending entity to provide the modules with additional processing time to transmit data within its scheduled time window.

In one embodiment, at least one module is adapted to identify parameters to determine a current network state, and to use said parameters to manage bandwidth of optimized streams.

In one embodiment, said identification step identifies per-flow and per-subscriber parameters and uses said parameters to optimize the data streams.

In one embodiment, at least one module is adapted to throttle data transmission on a per-subscriber basis in response to said monitoring.

In one embodiment, the throttling is performed by adjustment of a TCP window size. In one embodiment, the identification step comprises extracting security parameters.

In one embodiment, at least one module is adapted to build a database with per-subscriber usage records, and to implement per-subscriber data streaming according to said records. In one embodiment, the identification step monitors Iub/S1 links in an interceptor.

In another aspect, the invention provides a computer readable medium comprising software code adapted to perform operations of a gateway as defined above in any embodiment when executing on a digital processor.

DETAIL DESCRIPTION OF THE INVENTION

BRIEF DESCRIPTION OF THE DRAWINGS

The invention will be more clearly understood from the following description of some embodiments thereof, given by way of example only with reference to the accompanying drawings in which:—

FIG. 1 is a diagram showing at a high level stream de-duplication in a WAN;

FIG. 2 is a diagram illustrating the major functional blocks in systems of the invention to reduce data traffic in a mobile network with WCDMA, RNC, and Node B network elements;

FIG. 3 shows the system architecture;

FIG. 7 shows architecture of the gateway systems and FIG. 8 shows operation with a WAN optimizer system;

FIG. 9 shows cIub channels;

DESCRIPTION OF THE EMBODIMENTS

Figure 4:
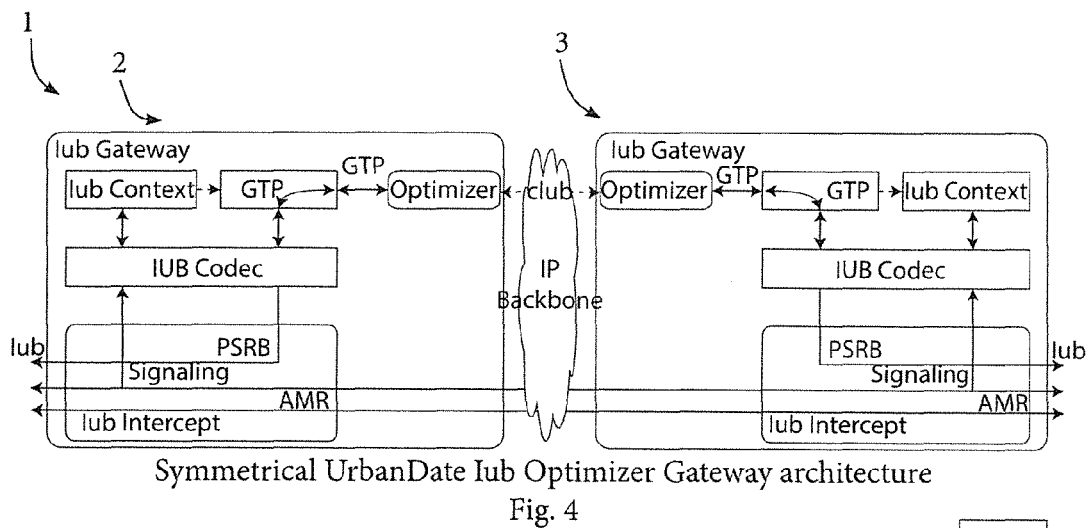
FIG. 4 shows impairment resolution in the data processing.

The invention provides a gateway system ("gateway" or "IGW") for achieving stream de-duplication in a mobile network, despite the difficulties imposed by the IUB (or "Iub", Interface UMTS connection RNC and Node B) interface.

The gateway 'turns' encrypted PS data traffic on the Iub interface into clear IP packets so that WAN stream de-duplication and other optimization can be performed to eliminate the transfer of repetitive data across the Iub interface, thereby increasing the throughput between the NodeB and the RNC of the WCDMA network. The gateway pulls PS data traffic out from Iub without disturbing the signaling and CS traffic. In one embodiment, the bifurcated PS data traffic is redirected to the GTP I/O port of the gateway where the stream deduplication is applied. Deployment of the gateway is transparent to the WCDMA network. No network reconfiguration is required to deploy the gateway on the Iub interface. While in the following the invention is described in the context of an RNC and a NodeB, it could equally be applied to any other type of core network element and remote base station and the relevant interface between them other than Iub.

FIG. 2 shows the gateway 1 as a pair of optimization modules 2 and 3, having the following layers from the top down:

4, tunnel multiplexing (linked);
5, packet compression;
6, stream de-duplication (linked)
7, header compression
8, GTP port;
9, cellular module IGW
Symmetrical Structure (FIG. 3)

The gateway 1 has a symmetric architecture—the gateway modules 2 and 3 at both ends have symmetrical functions. Their functions are similar but different in capacity. The gateway module 3 at the RNC side can support multiple gateway modules 2 at the NodeB side. One Iub gateway module 2 at the NodeB side is only paired with one gateway module 3 at RNC side.

Iub Impairment Resolution (FIG. 4)

The gateway 1 tracks the UE context to identify its signaling channel, CSRB (AMR), and PSRB. In order to avoid any impairment the Iub gateway 1 duplicates the CSRB (AMR) signaling channel to the application and bypasses the original one back on to the Iub interface.

In order to extract the clear IP packets for optimization, the Iub gateway 1 redirects the PSRB signaling channel to the application for further processing, which may introduce some latency and packet shape. The gateway enables some mechanisms to resolve the impairments introduced. The following are some of the major capabilities:

Sniffing Iub PS to collect the Integrity Protection Key and Encryption Key for PS data ciphering/deciphering
  Creating clear GTP I/O port on Iub
  Processing PS data
    Deciphering outgoing data (from tub to GTP I/O port)
    Ciphering incoming data (from GTP I/O port to Iub)
  Controlling data traffic
    Bifurcate processed Iub PS data traffic to GTP I/O port
    Merge clear IP data traffic from GTP I/O port into Iub
  Data packet compression and optimization
    Header Compression
    Stream Deduplication
    Packet Compression
    Tunnel Multiplexing The gateway 1 improves data service quality of 3G RAN through creating 'clear' IP port in Iub to apply Iub header compression and data packet compression. The gateway 1 resolves the Iub bottleneck issue in an inexpensive and efficient way, providing the following benefits:

Apply WAN optimization technology in Iub/WCDMA in a manner that is open to $3^{rd}$ party WAN optimization software
  Iub Header compression
  Increase Iub effective IP throughput by up to 87%
  Accelerate Iub IP latency
  Seamless integration as no WCDMA network reconfiguration is required
  Application-transparent System Architecture The gateway (IGW) optimizes the Iub bandwidth for UTMS/HSPA access networks. It works peer-to-peer over the Iub interface to provide the bandwidth optimization function, so each NodeB at the remote side and the RNC at core network side requires a dedicated IGW. The gateway 1 enables the Iub backhaul to provide more data throughput than its actual bandwidth capacity.

The IGW 1 extracts the IP packet from the Iub interface for optimization purpose at one end, and restores it back to Iub at the opposite peer end without any impairment.

Figure 5:
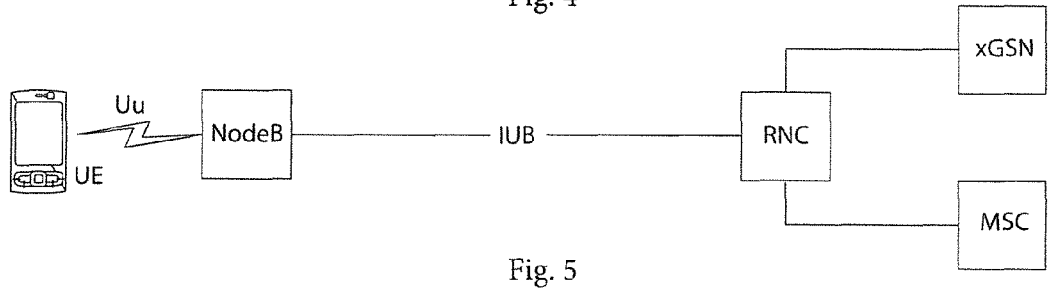
FIG. 5 is a general block diagram showing context of the system of the invention.

Referring to FIG. 5 a typical UMTS/HSPA UTRAN network includes a NodeB at the remote side and an RNC in the central office. The core network includes an MSC and a xGSN (GGSN/SGSN) which are co-located in central office. The MSC provides circuit switched voice services, while the xGSN provides packet switched data services to the UE.

The NodeB is connected to the RNC via the Iub interface and the RNC in turn is connected to the core network via the Iub interface. Usually the RNC is co-located with other core network equipment in the central office and the Iub interface between the RNC and the core network is often over optical fiber, so congestion rarely happens between the RNC and the core network. The Iub interface between the NodeB and the RNC is usually the bottleneck for the WCDMA data traffic and it is this interface that requires bandwidth optimization.

The NodeB is generally deployed at the antenna site. Most of them are far away from the central office where the RNC is deployed. The backhaul medium for the Iub interface between the NodeB and the RNC may not always be optical fiber as the installation cost of fiber is expensive. Instead, low cost backhaul for the Iub interface, such as E1/T1 circuits, microwave or satellite is deployed to transport the Iub interface. Once the Uu interface data traffic becomes more than the Iub bandwidth capacity of the low cost backhaul, congestion will happen.

Figure 6:
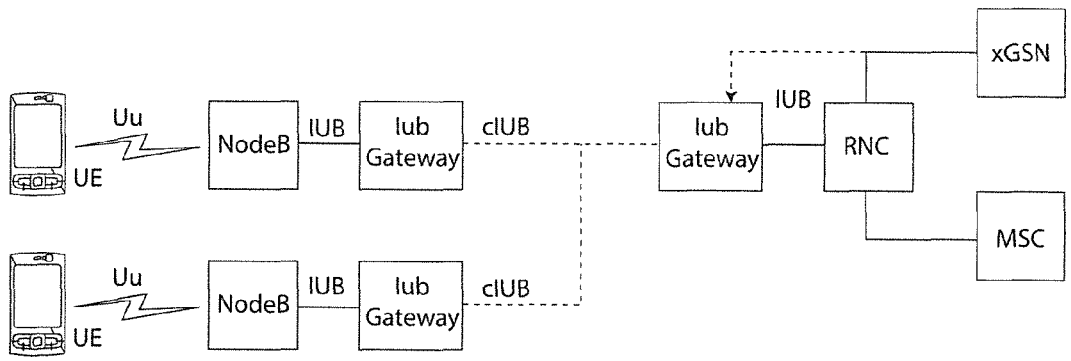
FIG. 6 shows positioning of the gateway system of the invention for traffic reduction.

Referring to FIG. 6, the invention symmetrically distributes the Iub gateway 1 (IGW) at each side of an Iub link. The IGW 1 compresses the Iub interface into compressed Iub ("cIub") on one side and restores it back to Iub on the other side. One dedicated IGW 1 is required for each NodeB and RNC, but the IGW for RNC has more capacity which is enough to support multiple IGWs at the NodeB side of the interface.

As illustrated in FIG. 6 each IGW 1 have two interfaces, the Iub interface to UTRAN (NodeB or RNC) and cIub interface to the peer IGW. The IGW compresses Iub data traffic and sends the output over cIub. At the other end the IGW decompresses the cIub back to Iub. There is one additional function at the IGW on the RNC side. The IGW at the RNC side has a third interface which is the IuPS interface used to capture the IK/CK keys for Iub deciphering.

The main function of the IGW is IP optimization, but the IP packets on the Iub interface are possibly segmented and repacked into the lower layer protocol—RLC/MAC/FP, and may be ciphered by the RLC layer. So the transport blocks on Iub interface should be deciphered and assembled into IP packet before any optimization can applied.

In order to apply optimization to the Iub interface two functional blocks are required; the cellular function and the optimization function. The interface between the cellular block and the optimization block is the clear GTP interface. Please refer to FIG. 7, which shows the architecture of one of the gateway modules 2, 3.

Cellular Function

The cellular function deciphers the Iub interface and reassembles the IP packets from RLC/MAC/FP layers on one end, and segments the IP packets into RLC/MAC/FP and ciphers the IUB at the other end. The cellular function contains four modules to accomplish this functionality.

Iub Interceptor

The Iub interceptor routes the radio bearers according to the routing table configured in an Iub context module, and:
  duplicates the NBAP to Iub Codec,
  duplicates the RRC signaling radio bearer to Iub Codec,
  redirects PS radio bearer to Iub Codec, and
  bypasses the AMR radio bearer to the optimization function Iub Codec The Iub Codec provides Iub decoding and encoding services to GTP and Iub context modules, and:
  decodes RRC/NBAP message for Iub Context,
  decodes PS radio bearer into IP(PDCP) for GTP,
  encodes IP(PDCP) for PS radio bearer,
  ciphers/deciphers the RRC and IP(PDCP), and
  suppresses the cipher procedure via manipulating UE ciphering algorithm to UEA0.

Iub Context

The Iub Context keeps track of all ongoing RRC sessions by:
  maintaining ongoing RRC sessions,
  building Iub contexts for Iub Codec and GTP conversion, and
  controls the Iub Interceptor routing table.

GTP Converter

The GTP converter converts IP transport between PS radio bearer and GTP interface.
  PS bearer to GTP:
    Collects decoded sequence numbers of lower layer from the Iub Codec module
    Maps the lower layer serial numbers into GTP headers.
    Encodes GTP and sends it to the optimization module
  GTP to PS bearer:
    Gets incoming GTP packets from the optimization module
    Decodes the lower layer sequence number from GTP header for the Iub Codec.
    Decodes the IP for the Iub Codec.

Optimization Function

The optimization function applies different intelligence at different stages to achieve better optimization performance; it includes header compression (HC), stream caching (SC), packet compression (PC) and multiplexing (MUX).

Header Compression

The header compression module compresses the protocol header into a short session ID by analysis of the ongoing context.

Streaming De-duplication

The streaming de-duplication module tracks all of the byte streams and stores the pieces of the byte stream into its local data dictionary. Once a repeated byte stream piece is identified the streaming de-duplication module will replace it with a token ID which can be used to restore the byte stream at the corresponding end of the link.

Packet Compressor

The packet compressor module compresses the content of a packet by removing repeated data inside the packet.

Tunnel Multiplexer

The tunnel multiplexer module multiplexes packets from different ongoing sessions into a single session to save packet header overhead.

Open GTP Interface to $3^{rd}$ Party WAN Optimizer (FIG. 8)

In this embodiment, the cellular module uses the standard GTP protocol to interface to an optimization module, and therefore it can communicate with any $3^{rd}$ party WAN Optimizer that supports the GTP protocol.

FIG. 9 gives a channel structure for each cell. It includes:
  Common channels (FACH, RACH and PCH) for RRC session setup
  NBAP link for radio link management.
  RRC SRB for signaling communications.
  CS RB for each voice call.
  PS RB for each PS call This gateway 1 keeps tracking the RRC setup procedures so PS RB can be extracted for optimization. In order to achieve this goal the IGW handles the following procedures:
  Capture common channel Identity.
  Decode Iub decoding and encoding.
  Build Iub context.
  Make GTP conversion.
  Intercept the Iub per Iub Context request
    Optionally suppress cipher procedure.
  Optimize the transport bandwidth.

Figure 10:
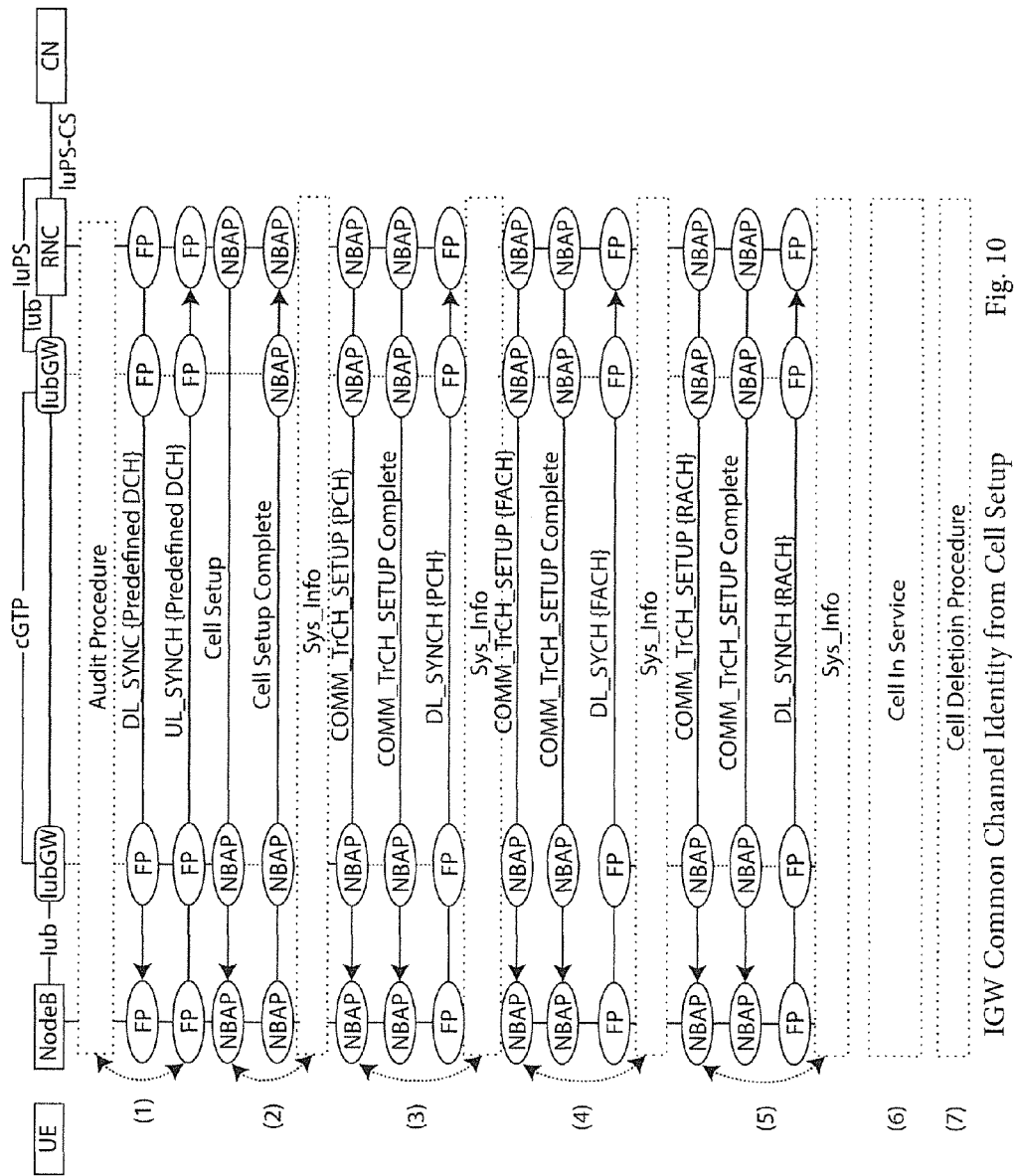
FIG. 10 is a ladder diagram showing common channel identity from call setup.

Common Channel Identity Capture FIG. 10

In order to identify the PS radio bearer for optimization, the IGW 1 builds the Iub context by tracking the ongoing Iub Signaling plane, including RRC and NBAP. As RRC setup procedure is carried over common channels IGW needs to capture common channel identity before RRC context can be captured.

The common channel identity includes IP address, port number, and Transport Format Set (TFS).

This invention enables three ways to capture the common channel identity, as set out below.

Common Channel Identity from Cell Setup Procedure

Referring to FIG. 10, after Iub comes online the RNC initiates the cell setup procedure to bring up the cell. The Common channel setup is part of the cell setup procedure, which includes the following the PCH setup procedure, the RACH setup procedure, and the FACH setup procedure This IGW 1 tracks the common channel setup procedures above to capture the following identities:
  BindingID element which carries FP port number.
  TransportLayerAddress element which carries IP address for its FP protocol
  Transport Format Set (TFS)

The identity is included in either COMM_TrCH_SETUP or COMM_TrCH_Setup_Complete messages.

The following example shows how to extract the port number and IP address from bindingID and TransportLayerAddress.
bindingID: c092
transportlayeraddress:
350001ac11737300000000000000000000000000 [bit length 160]
Port=0xc092 (49298), IP=0xac117373 (172.17.115.115)

Dynamically Identify the Common Channel Identity

In cases where the IGW 1 misses the cell setup procedure, this invention enables a dynamic means to identify the common channel identify. In practice some of the common channel identities are fixed once the Iub is setup:
- The IP address of the common channel is known as NodeB/RNC which terminates the Common Channel.
- FACH is running in downlink only, while RACH is running in uplink only.
- The message length for each common channel may be fixed.
- Some pattern can be found for identification.

From the above known identities the IGW filters out the common channel packet and decodes the IP port accordingly to setup common channel interception. This is illustrated in detail in the following table:

| | | | Input | | | | | Output | |
|---|---|---|---|---|---|---|---|---|---|
| | | | | Msg | Message Pattern | | | Dst | Src |
| CCI | Dst IP | Src IP | Direction | Len | offset | Len | Data | Port | Port |
| RACH | RNC | NodeB | DL | 28 | 04 | 1 | 0x40 | ?? | ?? |
| FACH | NodeB | RNC | UL | 48 | 2 | 2 | 0x00 0x09 | ?? | ?? |

Configurable Common Channel Identity

If the common channel identity is fixed for some UTRAN deployments, this gateway can take the configurable common channel identity as follows.

| CC | Dst IP | Dst Port | Src IP | Dst Port | Direction | TFS |
|---|---|---|---|---|---|---|
| FACH | RNC | AAAA | Nodeb | AAAA | DL | |
| RACH | NodeB | BBBB | RNC | BBBB | UL | |

Once the common channel identity for a specific cell is identified, the IGW starts tracking the RRC setup message on the common channel, specifically the downlink FACH channel.

Iub Codec

Figure 11:
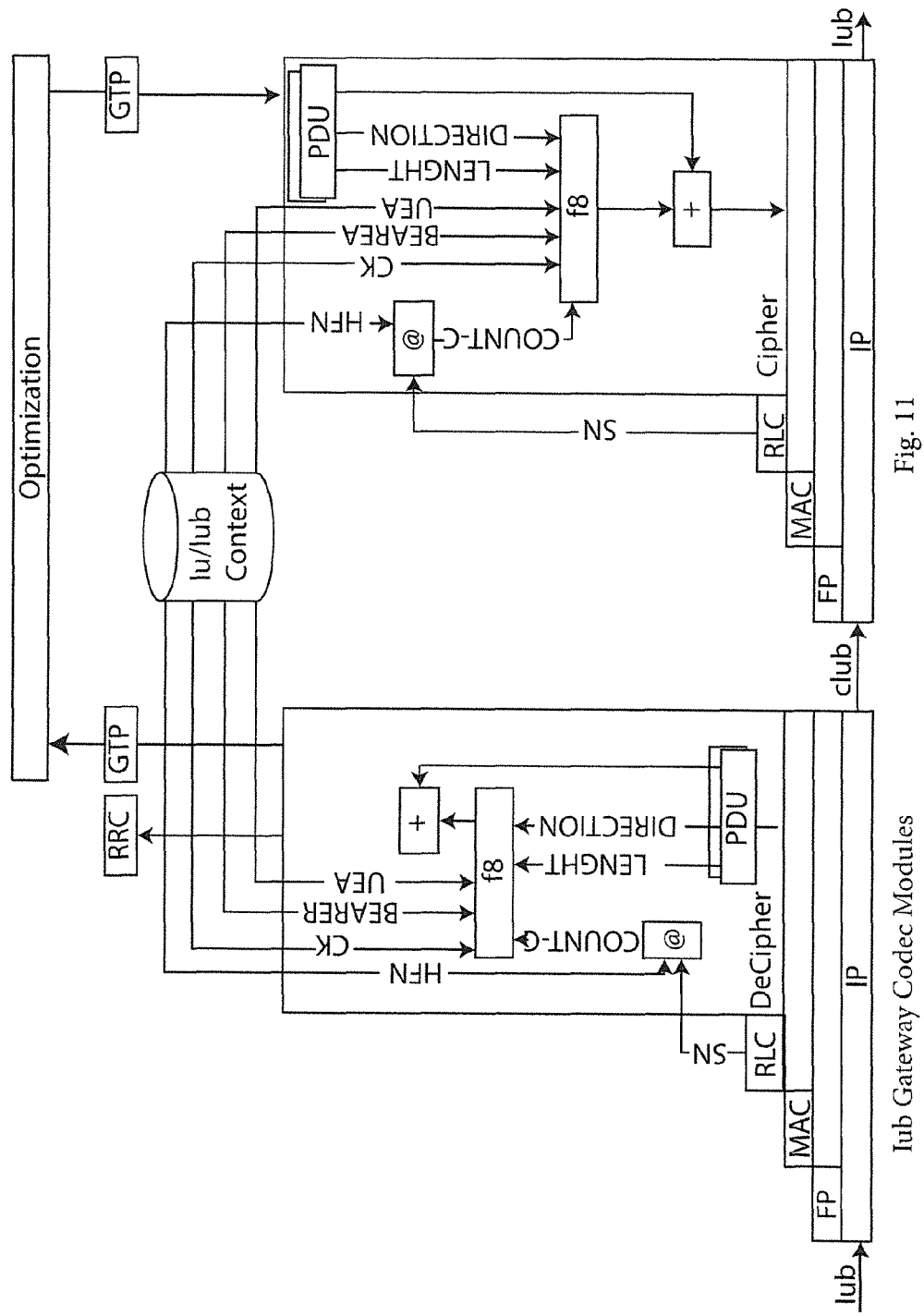
FIG. 11 shows gateway system codec modules.

Referring to FIG. 11, the Iub codec module decodes the FP packets from the Iub interceptor into RRC and IP/PDCP on one side, and encodes the IP/PDCP back to the FP on the other side. The Iub Codec module includes FP, MAC, and RLC for the Uu interface and NBAP for the Iub interface.

Multiple FP Transport Time Intervals

The FP transport Time Interval (TTI) is configured via NBAP/RRC procedures. Typical TTI for WCDMA is 10/20/30/40 ms. The typical TTI for HSDPA is 2 ms.

The IGW supports multiple TTI as required by WCDMA and HSDPA. On the ingress side the IGW handles the FP packet whenever it receives it, however on the egress side the IGW will hold the FP packet until the TTI expires.

FP Filtering

The FP can run in normal mode which sends out one FP packet each TTI no matter whether data is available or not, and silent mode which sends out a FP packet only when FP data is available.

The FP packet is carried by IP/UDP/FP with minimal length around 32 bytes (empty FP packet). The empty FP flow occupies 25.6 kbps (TTI=10 ms). In order to save the Iub bandwidth this invention enables the IGW to terminate the empty FP packet from the Iub interface, and regenerate it from the counterpart IGW.

FP Latency Tolerance

FP employs CFN to time stamp each FP packet. In order to verify if one FP packet arrives at the right time, FP checks if it's CFN is between AWS (Arrival Windows Start) and AWE (Arrival Windows End). As the FP data packet traverses the two IGWs some latency may be introduced. This gateway manipulates the CFN accordingly so it can fit within the Arrival Window.

Bypass FP Control Messages for PS Radio Bearer

The IGW separates FP control messages from FP data messages via its frame type defined in 3GPP 25.427-6.2.7.2. The Iub Codec bypasses the FP control message from PS radio bearer to peer Iub Codec directly. The FP control message includes FP control and HSDPA control as defined in 3GPP 25.427 and 3GPP 25.435

FP FACH/RACH

The FACH/RACH is used to carry RRC setup procedure. The IGW decodes this common channel according to 3GPP 25.427-6.2.1 and 6.2.3.

FP HSDPA

HSDPA provides high bandwidth downlink IP transmission. The IGW decodes and encodes the FP HSDPA packet for RLC/MAC according to 3GPP 25.427. The HSDPA control part is bypassed as defined earlier.

FP DCH for RRC and PS Radio Bearer

The DCH provides a transport channel for RRC and PS. The IGW decodes the DCH for the Iub context module and PS radio bearer for RLC/MAC. The IGW also encodes PS radio bearer for RLC/MAC as defined in 3GPP 25.435.

FP EDCH

The EDCH provides high bandwidth uplink IP transmission. The IGW decodes and encodes the FP EDCH packet for RLC/MAC according to 3GPP 25.427.

MAC Channel Mapping

The IGW decodes the logical channel from the transport channel in one direction and maps the logical channel into transport channel in the other direction, according to the channel mapping table which is configured by the Iub context module.

RLC Control Message Bypass

The IGW decodes the RLC SDU from the RLC data packet for the radio bearer, and encodes RLC SDU from the radio bearer into RLC data packet. The IGW decodes the RLC control message to update its SAP context and bypasses the control message to peer RLC.

Multiple RLC Modes

The IGW supports all three RLC modes, which are Transparency, Acknowledged and Unacknowledged mode as required by 3GPP.

Multiple RLC PDU Length

The IGW supports 7 bits and 15 bits PDU length as required by 3GPP.

RLC Deciphering/RLC Ciphering

The Iub Codec module provides ciphering and deciphering functionality for PDU per Iub context request. It prepares all related security parameters for Kasumi f8 algorithm.

Transparency on RLC Retransmission

Sometimes the RLC package will be retransmitted due to package loss, for example, P1,P2,P1,P2,P3. The system carries the retransmission information to the peer RLC so the retransmission can be restored. The IGW sends the RLC retransmission flags to the counterpart to recover the transmission.

NBAP

Iub Codec decodes NBAP for Iub Context module:
- Decoding Cell setup procedure for capturing common channel
- Decoding Radio link setup, radio link reconfiguration, radio link release for the radio link table.

Iub Context

Figure 12:
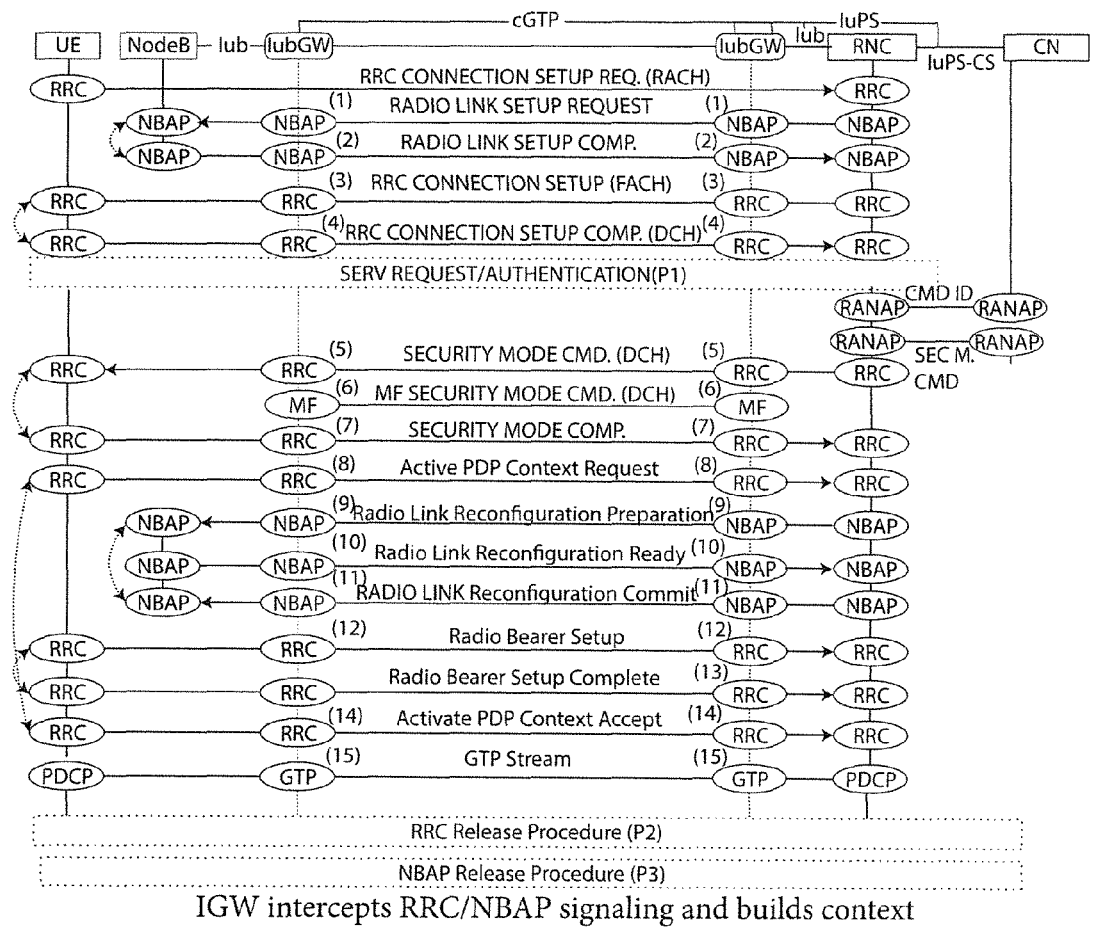
FIG. 12 is a ladder diagram showing interception of RRC/NBAP signalling.
Figure 13:
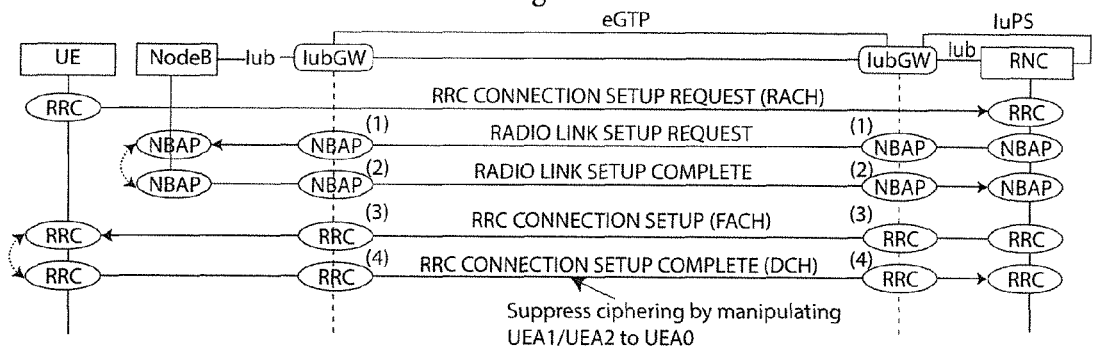
FIG. 13 shows ciphering suppressing.

Referring to FIG. 12, the IGW intercepts RRC/NBAP signaling and builds the context accordingly without any impairment.

Radio Link Table

The IGW intercepts the NBAP message to track the Radio link status:
- Radio link Setup procedure to establish the radio link and SRB for RRC
- Radio Link reconfiguration procedure to add more RB for voice or for IP per UE request.
- Radio link release procedure to release the radio link which was setup earlier RRC Table Each Radio link carries one or more SRB/RB, which are setup and configured by RRC procedures:
- RRC setup procedure; setup SRB initially and transport channel accordingly.
- Radio bearer setup procedure; adds more RB for voices or for IP per UE request.
- RRC release procedure; releases the RRC connection which is setup earlier.

Correlate NBAP with RRC Table

The IGW maintains the Iub context based on the Radio link table. Each Radio link is connected to its RRC via an uplink scrambling code and downlink channelization which can be decoded from Radio link setup message.

Iub Context Table

Each attached UE has a dedicated radio link in the radio link table, and each radio link carries one or more radio bearers, which pertain to the services for the attached UE, either CS or PS.

Based on the Iub context (radio link table) the IGW is able to do GTP conversion for PS RB.

| Per UE | Remark |
|---|---|
| RadioLink[0] | UL ScramblingCode, DL ChannelCode |
| RadioLink[1] | |
| RadioLink[n] | Per RadioLink |
| TC[0] | |
| TC[1] | |
| TC[j] | Per TC |
| | LC[0] |
| | LC[1] |
| | LC[k] |

Channel Mapping Table

The RRC procedure defines the mapping table for each radio bearer, its RLC mode, Logical Channel (TC) and Transport channel (TC).

This invention builds this table for the Iub Codec module.

| RB# | RLC Mode | LC# | TC# |
|---|---|---|---|
| DL0 | UM | 0 | 16 |
| UL0 | TM | 0 | 16 |
| DL1 | UM | 1 | 16 |
| UL1 | UM | 1 | 16 |

Transport Channel Table

The RRC procedure defines the Transport Channel table for the transport channel, its TTI, RLC size, TB size and CRC size. This invention builds this transport channel table for the Iub Codec module.

| DCH# | TTI | DCH TFS | | Semistatic TF |
|---|---|---|---|---|
| | TTI | RLCSize | TBSizeList | CRC Size |
| 16 | 40 | sizeType1:16 | 0, 1 | CRC16 |

IP Routing Table

The IGW is responsible for configuring the routing table for the Iub Interceptor module. It keeps tracking the Iub context. Once the radio bearer category is identified, the bearer will be added to the table. The radio bearer will be removed once the session is finished. The table includes the following entries:
- Duplicates NBAP link
- Duplicate all RRC radio bearers
- Redirect PS Radio bearer
- Bypasses all AMR radio bearers Ciphering The IGW deciphers the Iub interface via the IK/CK captured from Iu interface. The IGW keeps tracking the Iu interface for the Security_Mode_Command message. Once the message with ciphering enabled is captured the IGW will extract the IK/CK along with UE ID. The IGW tries to find the right Iub context which matches this Security_Mode_Command message via its UE ID and updates the IK/CK in the Iub context. Later, the IK/CK will be synchronized to the peer IGW via the MG_Security_Mode_Command message.

The ciphering procedure is configured once the IK/CK is updated. The IGW monitors the right moment to start the ciphering procedure via the Securiy_Mod_Command on the Iub interface. Once the ciphering procedure is started the IGW collects ciphering parameters for RLC which implements the f8 algorithm.

Ciphering Suppression

Ciphering consumes network resource, so it may be unnecessary in some scenarios. This invention suppresses the ciphering procedure via manipulating the UE encryption version from UEA1/UEA2 to UEA0 (UEA1 and UEA2 mean UE encryption version one and two respectively, while UEA0 means no encryption). Once the RNC recognizes that the UE does not support encryption the ciphering procedure will be disabled, so the IGW can work on the clear Iub without ciphering.

GTP Conversion

Figure 14:
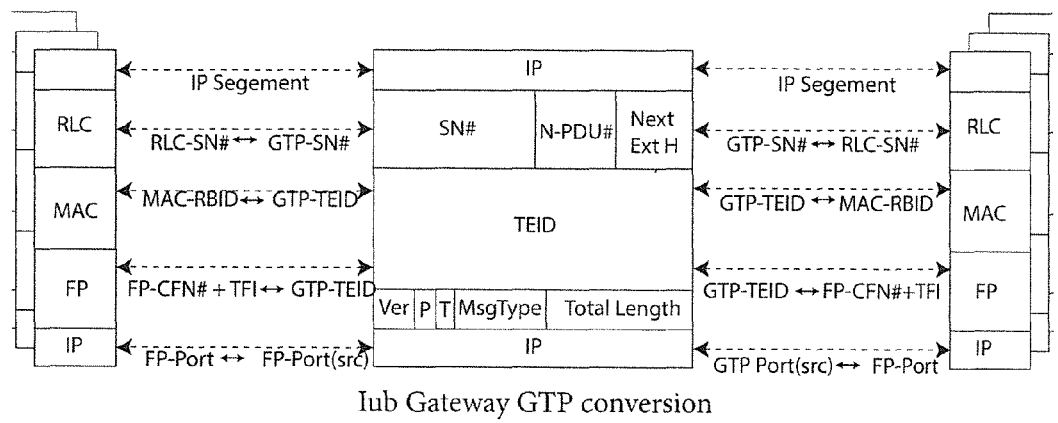
FIG. 14 shows GTP conversion.
Figure 15:
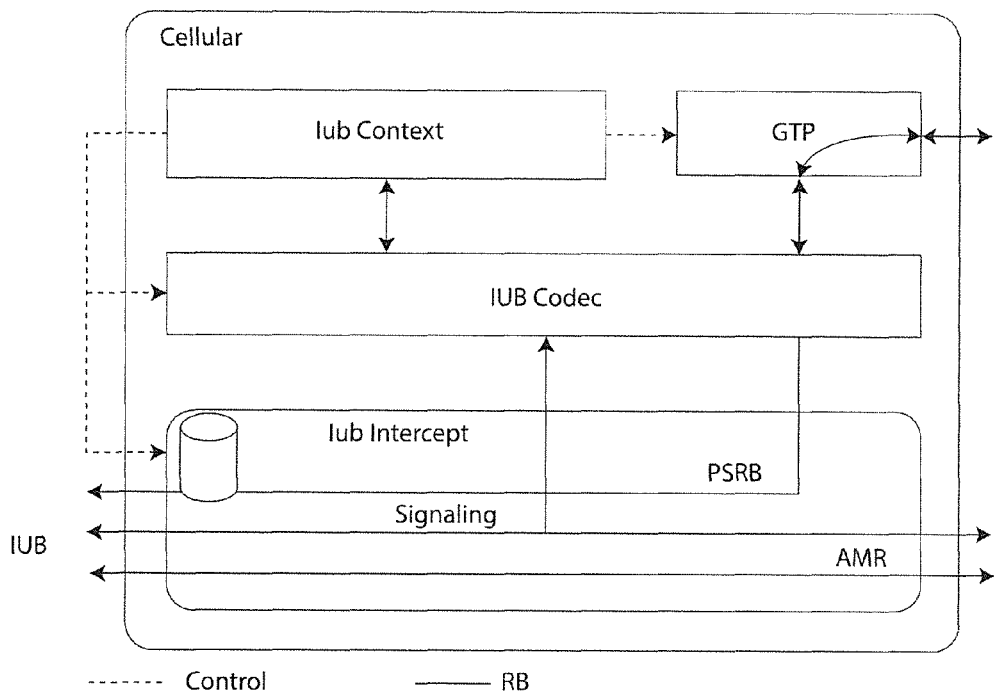
FIG. 15 shows an interceptor.

In FIG. 14, the IGW terminates the incoming PS radio bearer. The packets pass through FP, MAC and RLC protocol layers. Each layer decodes the header part and sends the SDU to the next layer. Finally the RLC layer sends the Clear IP to GTP. On the other side the IGW gets the clear IP from GTP and encodes the packet into the different RLC, MAC and FP protocols before sending it to Iub. The above packet conversion only covers the data part. The IGW passes the control signaling for FP, MAC and RLC directly to the counterpart.

The IGW traces each PS radio bearer in the radio link table and makes the GTP conversion accordingly. In order to avoid any impairment all the sequence numbers from FP, MAC RLC will be decoded and mapped to the GTP header so it can be recovered back on the other side for re-encoding.

IP Port Mapping

FP is carried by UDP/IP between NodeB and RNC. The IP is fixed to NodeB and RNC IP so it can be recovered on the peer side. However the Port is dynamically assigned and therefore needs to be mapped to the GTP protocol. This invention maps the port to the source port of the GTP interface.

FP Mapping

The parameters decoded from the FP protocol need to be mapped to the GTP so it can be recovered from the peer server. The IGW maps DCH, EDCH and HSDPA FP parameters into first 24 bits of GTP TEID

| DCH | EDCH | HSDPA | GTP TEID |
|---|---|---|---|
| CFN b00-b07 | CFN b00-b07 | Fr Seq# b00-b03 CmCh-Pi b00-b03 | b00-b07 |
| TFI b00-b04 | FSN b00-b03 SubFrames b00-b03 | MAC-d PDU Len b00-b07 | b08-b15 |
| QE b00-b07 | SubFrames # b00-b02 | PDUs b00-b07 | b16-b23 b24-b31 |

MAC Mapping

The IGW maps Radio bearer ID into b24-b31 of GTP TEID.

RLC Mapping

The IGW maps the RLC 12 bit sequence number into b00-b11 of the GTP Sequence number. In order to duplicate the RLC transmission packet, the IGW generates retransmission flags and maps it to b12-b15 of the GTP sequence number.

PDCP Over GTP

Once the PDCP feature is enabled between the UE and RRC, the IP header will be compressed into several bytes session ID, this invention delimits the PDCP packet to fit it over GTP.

Multiple IP Packets Over Single GTP

One HSDPA or EDCH packet may carry several IP packets; the IGW converts all IP packets carried by one HSDPA or EDCH packet into single GTP packet to save bandwidth.

Partial IP Packet Over Single GTP

One IP may be segmented and carried by different FP. Waiting for the whole IP packet arrival will cause latency. This invention transmits partial IP packets over GTP to avoid latency.

Iub Interceptor

The IGW intercepts the Iub interface without any impairment. It duplicates the signaling part (the NBAP/RRC) to build the Iub context, it redirects PS RB for GTP conversion, and it bypasses CS RB. The Iub Interceptor routes the packet according to the following routing table configured by Iub Context module.

In_Dev: ingress LAN port where the IP packet comes in
Out_dev: egress LAN port where the IP packet leaves
Protocol: UDP/TCP/SCTP
Src_ip/Src_port: source IP/Port of the IP packet
Dst_ip/Dst_port: destination IP/Port of the IP packet
Min_len: Minimal length of the IP packet
Action: action for this packet
FP_Type: DCH, RACH/FACH EDCH or HSDPA

| In-Dev | Out_dev | proto | Src IP | Src port | Dst IP | Dst port | Min Len | action | FP Type |
|---|---|---|---|---|---|---|---|---|---|
| Eth0 | Eth1 | UDP | S.S.S.S | PPPP | D.D.D.D | XXXX | LLLL | A | DCH |

IP Packet Bypass

Any packet which does not meet the criteria defined in the routing table will be bypassed like AMR radio bearer.

IP Packet Duplication

If the packet meets one of the criteria defined in the routing table and its action is duplication, the packet will be duplicated to user space for further handling. And the original packet will go through without any impairment.

IP Packet Redirection

If the packet meets one of the criteria defined in the routing table and its action is Redirection, the packet will be redirected to user space for further handling. The user space handling can decide to drop the packet or let it go through without any impairment.

Bandwidth Optimization

Figure 16:
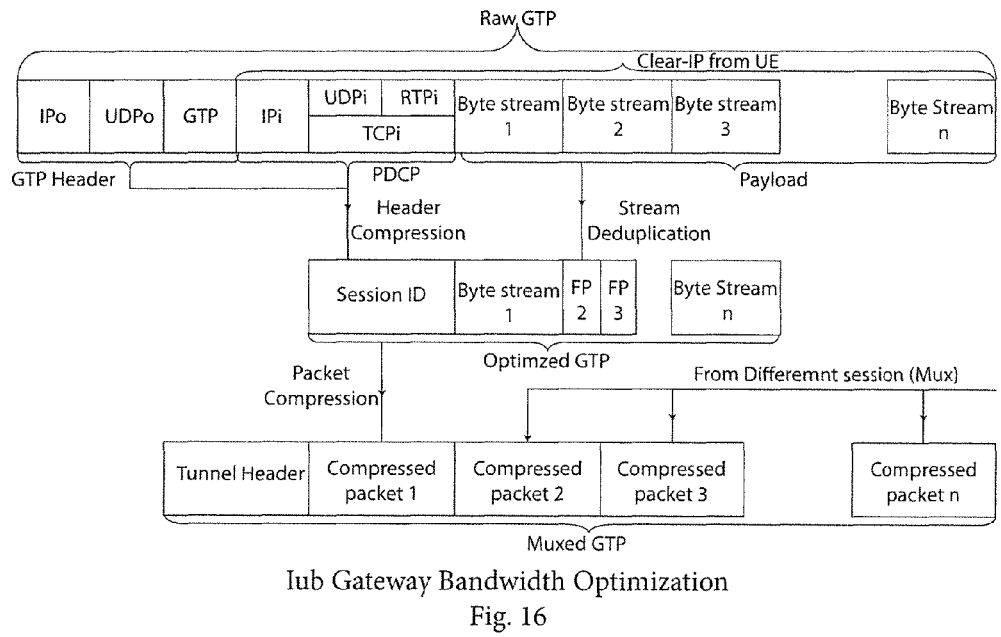
FIG. 16 is a flow diagram showing bandwidth optimization.

FIG. 16 shows the clear-IP to/from the UE that is put on top of the GTP tunnel. The GTP packet includes the GTP header and the clear-IP. The Iub cellular module builds the GTP header (IPo/UDPo/GTP) to carry the clear IP. The clear-IP includes the IP header (IPi/UDPi/RTPi/TCPi) and payload. The IP header may be a real IP header or compressed as a short session ID by PDCP between UE and RNC.

Each raw GTP packet includes the GTP header and clear-IP header. The IGW performs header compression over packet header (GTP header and clear-IP header) and stream de-duplication over payload to get an optimized GTP packet, which will be compressed and Sent over a Multiplexed tunnel.

Header Compression

As mentioned above the header portion includes GTP header added by the IGW, and the clear-IP header which may or may not be compressed by PDCP. The GTP header includes IP header (20 bytes), UDP header (8 bytes) and GTP header (12 bytes), totally 40 bytes. This invention compresses header into 8 bytes session ID as follows Session ID=
FP port (2 bytes, mapped to source port of GTP)+FP/MAC sequence number (4 bytes, mapped to TEID of GTP)+RLC sequence number (2 bytes, mapped to sequence number of GTP)

The clear-IP header may be 2-bytes PDCP header if PDCP is enabled in RNC; otherwise it is real IP header which will be compressed into 2-bytes PDCP header by IGW. So, the header can be compressed into 10 bytes session ID.

Stream De-duplication

This mechanism keeps tracking each piece of the byte stream and builds the dictionary accordingly from each side of the Iub. Once the repeated byte stream pieces are found, they will be replaced with the token ID which can be restored from the counterpart on the other side of the Iub. The IGW compresses the content by removing the repeated byte stream which was transferred earlier.

Packet Compression

After the GTP packet is optimized the packet compression process compresses the packet by removing the repeated part within the same packet. The IGW implements the LZ algorithm to compress the header.

Tunnel Multiplexing

Tunnel Multiplexing carries packets from multiple sessions to reduce the packet overhead. The compressed GTP uses the FP port as an identifier, which is not compressed by the packet compression module.

LTE Network

LTE Architecture and Security

Figure 17:
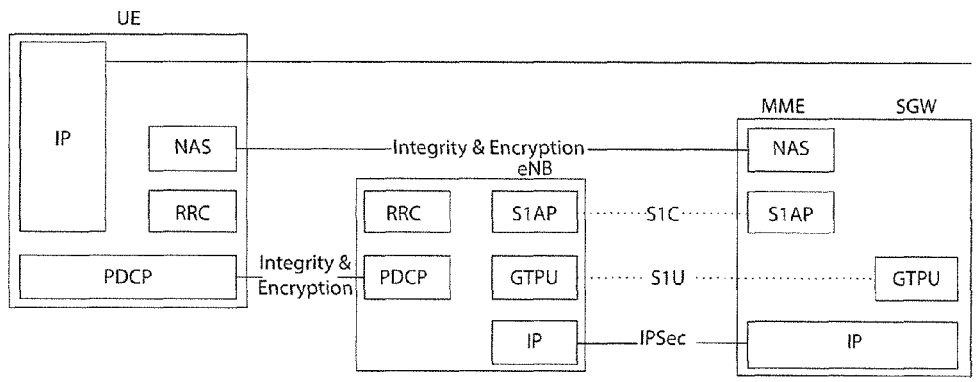
FIGS. 17 to 20 are diagrams showing application of the gateway to an LTE network.

Referring to FIG. 17, the LTE network gets flattened when comparing to the UMTS architecture, as the RNC element is eliminated and its functions migrated to the eNodeB. The LTE eNodeB is equivalent to the NodeB+ RNC of the UMTS architecture. The interface between eNodeB and core network is the S1 interface, which can be divided into control plane S1C, and user plane S1U. S1C carries NAS/S1AP between the eNodeB and the MME, while S1U is carries GTPU interface between the eNodeB and the SGW.

Figure 18:
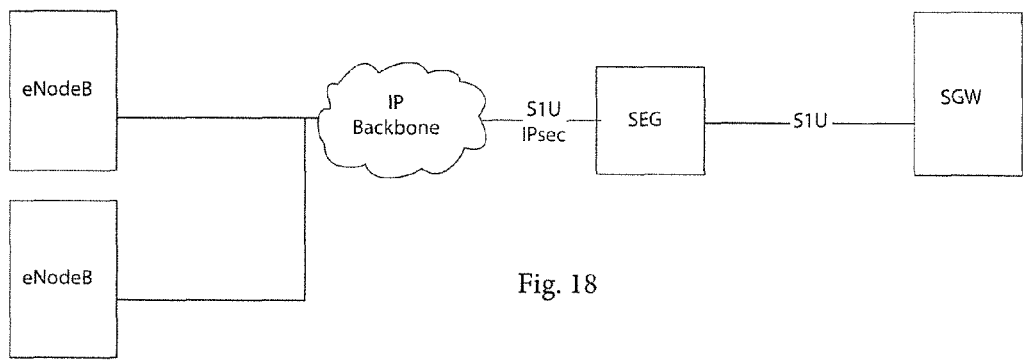
Figure 19:
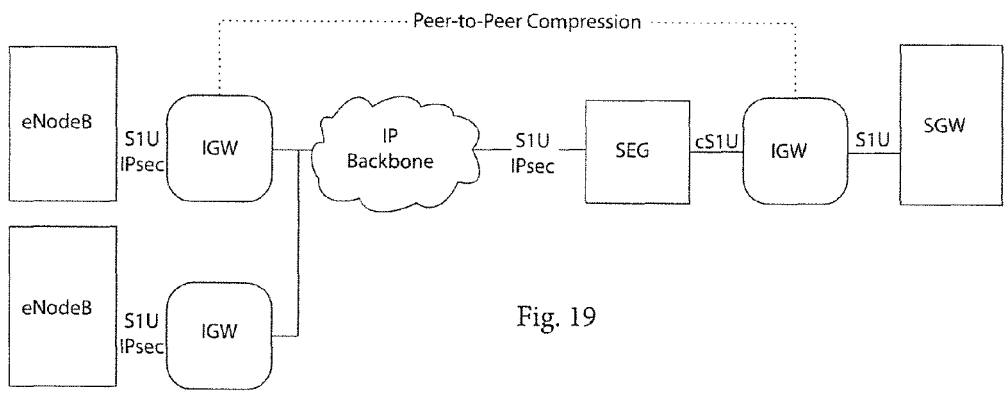

Referring to FIG. 18, the LTE air interface between the UE and eNodeB is equivalent to the UMTS air interface, where the integrity and encryption are implemented to protect the RRC, NAS and IP traffic. The Difference from UMTS, is that the NAS is protected one more time by integrity and encryption procedures between UE and MME.

In most cases the eNodeB is deployed in remote sites near to the antenna with the S1 interface exposed to public network. 3GPP adopts IPsec for the S1 interface protection, which means that elements terminating the S1 interface need to support the IPsec interface, no matter if it is embedded in the element or implemented in a dedicated security Gateway (SEG).

Most eNodeBs embed the IPsec function in the same box, while dedicated security gateways (SEG) may be deployed at the central site to offload the SGW/MME traffic. The increase in 3G data services is causing the congestion on the Iub interface. In the 4G Long Term Evolution, the LTE network has the same issue on its access interface (S1). The S1 congestion situation in LTE is even worse than the Iub congestion in 3G, as the LTE air interface provides much higher capacity than 3G.

The IGW pair compresses Iub traffic to resolve the Iub congestion. Each IGW includes a cellular part and an optimization part. The Cellular part packs clear IP from Iub into GTP format at one side and restores the GTP back to Iub on the peer side. The optimization functions at both sides compress the GTP traffic in between to optimize the Iub data throughput.

In LTE, the S1 congestion usually occurs on the S1 user plane of the S1U interface. Traffic running on the S1U interface is actually GTPU that can be compressed by the optimization part of the IGW. The solution for optimizing the S1U interface traffic in LTE is similar to Iub in WCDMA; The IGW is deployed on each side of the S1U interface to compress the S1U (GTPU) traffic to resolve the S1U congestion.

The IGW architecture for the S1U interface is the same as the architecture for the Iub interface. A dedicated IGW is required for each eNodeB and SGW, but the IGW at the SGW side requires larger capacity to deal with multiple IGWs on the eNodeB side.

As mentioned above the S1U interface is secured by the IPsec protocol. In order to extract the clear S1U (GTPU) traffic from the IPSec protocol, the IGW at eNodeB side needs to terminate the IPsec protocol at both ends from/to the eNodeB and SGW.

In order to terminate the IPsec protocol, the LTE operator must share the eNodeB IPSec pre-shared key with the IGW, as it is required to build the Security Associate (SA) database. Once the IPsec interfaces are terminated then IGW can access the S1U (GTPU) traffic and the optimization part of the IGW can start working on the S1U optimization in the same way as it works on the Iub interface.

Figure 20:
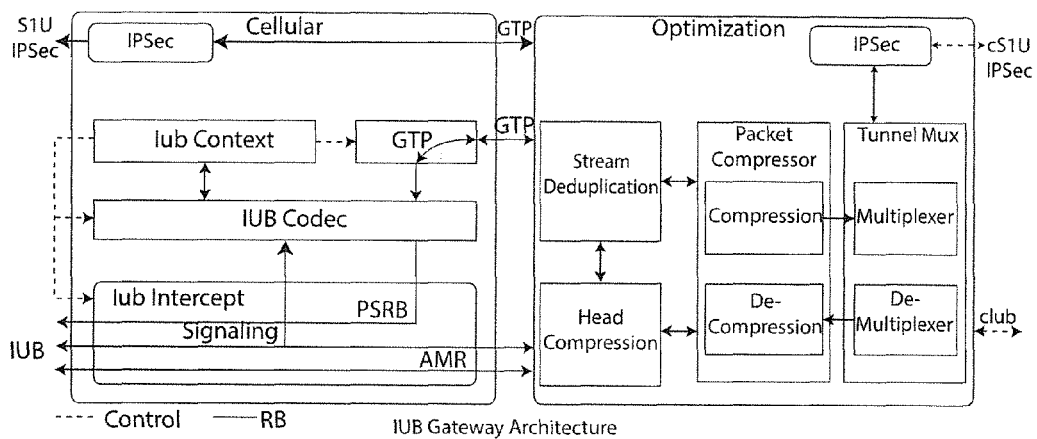

IGW Enhancement (FIG. 20)

The above section explains that the IGW is required to support IPsec for terminating the S1U interface from both sides in back to back mode. As illustrated in above diagram, IPsec modules are added to both Cellular part and Optimization part of IGW to support the LTE architecture. The S1U/IPsec interface is terminated at the IPsec module of Cellular the module, which in turn sends the GTP to the Optimization module for compression. The Optimization module compresses GTP into cS1U and then secures it with IPsec before sending out. In the reverse direction the Optimization module terminates the IPsec protocol and restores the cS1U into GTP for Cellular module. The Cellular module then secures the GTP with IPsec before forwarding to the eNodeB.

The Iub Gateway can support both Iub and S1U optimization. The LTE piece of the invention includes the following two aspects:

S1U Compression architecture
Back to Back IPsec Gateway

Iub Gateway Optimization Ratio Estimation

This is known:
GTP Header=40 byte
PDCP Header=40 byte
Header Compression:
Compressed GTP Header: 40 byte→8 byte
Compressed PDCP Header: 40 byte→2 byte
IP Header=28 Byte
Set:
IP Content is 1,000 bytes
The total length of a GTP packet without optimization is =
40+40+1000=1080 byte
Packet Compression ratio is 50%
Tunnel Mux multiplexes 4 sessions into 1 packet Case 1: Assume Stream Deduplication optimization ratio is 25%, then:
IP Content 1000 byte→Compressed IP Content 750 byte
Total length of the compressed GTP packet
=Compressed GTP header+Compressed IP Content
=8+2+750
=760
The length of the compressed GTP packet after Packet Compression becomes:
Compression packet=760/2=380
Total length of the GTO packet after x4 Mux becomes:
=380+(28/4)=387 byte
Total Length of the 1080 bye GTP packet becomes 387 bytes.
Hence, overall compression ratio of the Iub Gateway optimization is 387/1080=64.17%
Case 2: Assume Stream Deduplication optimization ratio is 50%, then:
IP Content 1000 byte→Compressed IP Content 500 byte
Total length of the compressed GTP packet
=Compressed GTP header+Compressed IP Content
=8+2+500
=510
The length of the compressed GTP packet after Packet Compression becomes:
Compression packet=510/2=255
Total length of the GTO packet after x4 Mux becomes:
=255+(28/4)=262 byte
Total Length of the 1080 bye GTP packet becomes 263 bytes.
Hence, overall compression ratio of the Iub Gateway optimization is 263/1080=75.74%
Case 3: Assume Stream Deduplication optimization ratio is 75%, then:
IP Content 1000 byte→Compressed IP Content 250 byte
Total length of the compressed GTP packet
=Compressed GTP header+Compressed IP Content
=8+2+250
=260
The length of the compressed GTP packet after Packet Compression becomes:
Compression packet=260/2=130
Total length of the GTO packet after x4 Mux becomes:
=130+(28/4)=137 byte
Total Length of the 1080 bye GTP packet becomes 137 bytes.
Hence, overall compression ratio of the Iub Gateway optimization is 137/1080=87.31%

Bandwidth Management

In another embodiment, the gateway includes a mechanism in the GTP level 8 of FIG. 2 to identify and monitor cellular parameters to determine the current network state, and to expose these parameters to support modification of application traffic flow at IP level and above. This optimises network behaviour by virtue of congestion avoidance or control, QoS and end user QoE). An example is identification of "hungry users who are taking up a disproportionate amount of bandwidth relative to their SLA, and throttling their sessions.

As well as cellular parameters influencing IP level parameters at the application level the invention allows for a mechanism to use application-level data (IP level and above) to build a model of current network state, and use this information to modify behaviour at the cellular protocol levels to optimise network behaviour (congestion avoidance/control, QoS and end user QoE). Also, per-flow and per-subscriber level cellular parameters are identified from the Iu interface similar to the mechanism to extract security parameters described with reference to FIG. 9, which can then be used to modify both cellular and IP level traffic flows with the RAN.

Iu extraction is merely an example, however the invention also covers other mechanisms such as S1 and Iuh. Also, per-flow and per-subscriber level cellular parameters are identified from the cellular interfaces which can then be used to modify both cellular and IP level traffic flows with the RAN in a similar way to the mechanism shown for Iu interface to extract security parameters described above with reference to FIG. 9.

Hungry users cause Iub/S1 congestion, and in many cases few hungry users consume most of the bandwidth. The IGW bandwidth manager software functions address this by monitoring the Iub/S1 usage and managing Iub/S1 bandwidth once congestion is detected to limiting the hungry users' bandwidth.

In one embodiment, the IGW bandwidth manager builds an RBDB (Radio Bearer Database) for each user to achieve this. There is also TCP rate control in which the IGW manipulates the windows size to limit the downlink rate. This is achieves with a normal UE Down Link TCP flow control procedure, in which:

the downlink TCP Rate=Server-SWS/Roundtrip-Latency (RTL),
the UE Receiving Window Size (RWS)=Server Sending Window Size (SWS),
the UE advertises its RWS to serve along with its uplink packet,
the server updates its SWS to UE's RWS,
the downlink TCP Rate slows down once UE RWS shrinks, and
the downlink TCP Rate speeds up once UE RWS gets large.

Figure 21:
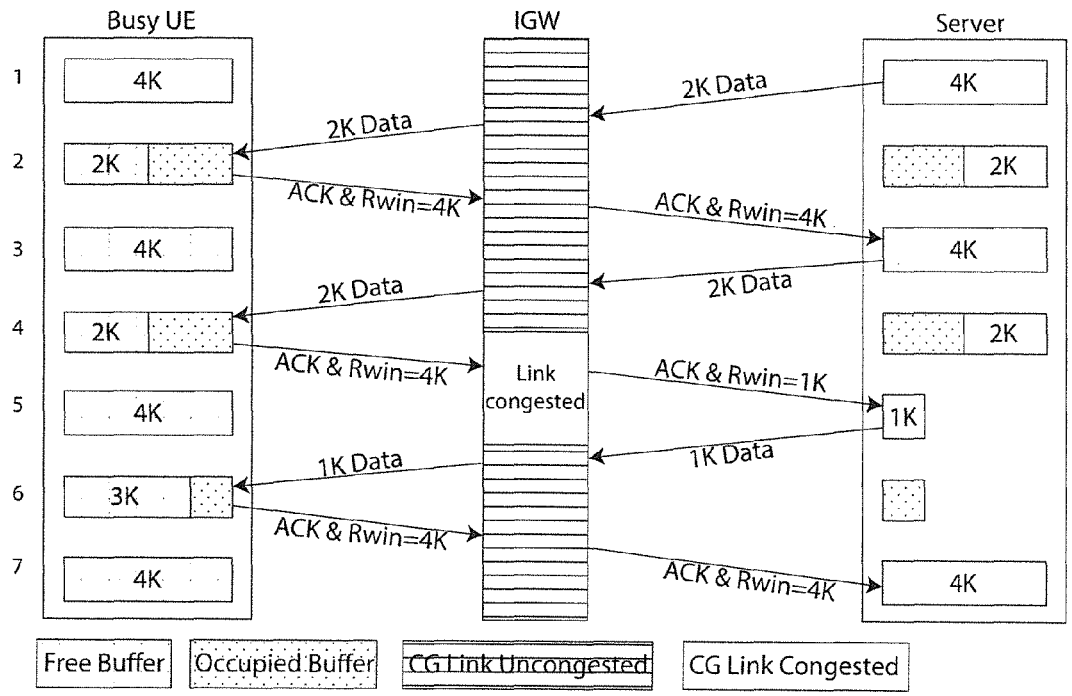
FIG. 21 is a diagram illustrating per-subscriber data optimization.
Figure 22:
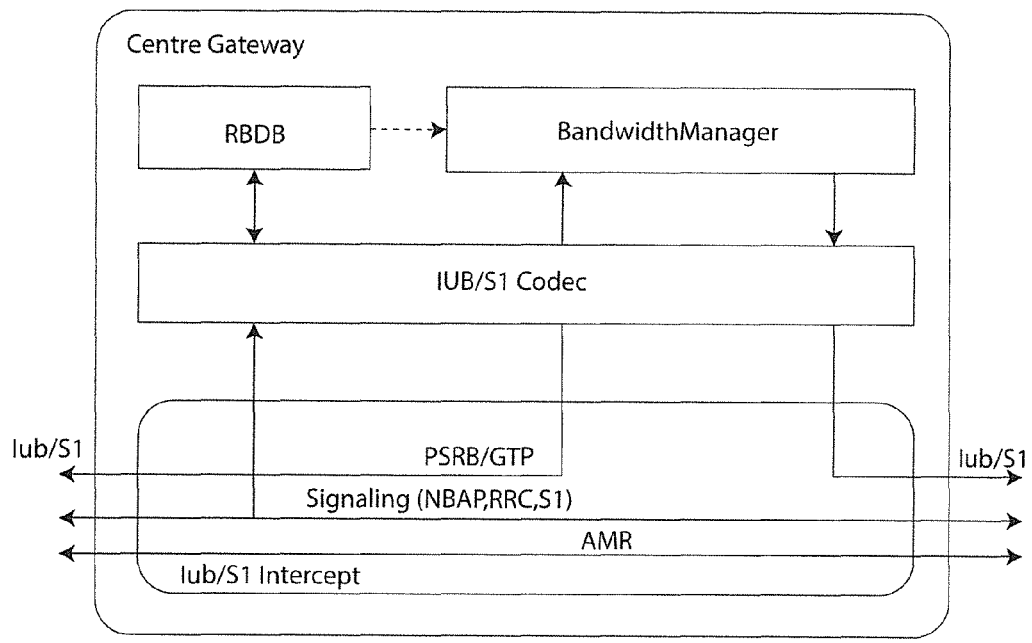
FIG. 22 illustrates structure of a gateway module to achieve such optimization.

Referring to FIGS. 21 and 22, the IGW manages the TCP rate by monitoring the Iub/S1 link, identifying a "hungry" user, shrinks the hungry UE's RWS to limit its rate, and by-passes the UE's RWS once congestion is gone. The Iub/S1 interceptor bypasses the AMR and signaling and duplicates signaling to the upper layer. The Iub/S1 Codec decodes signaling or RBDB and decodes/encodes PS for Bandwidth Manager.

The RBDB (Context) maintains ongoing sessions, monitors Iub/S1 link usage, triggers TCP rate control. The bandwidth manager is triggered by the RBDB and there may be a new module to Iub/S1 optimization. Transparency is achieved because no extra packets or bytes are introduced The architecture monitors Iub/S1 traffic and maintains the RBDB for each UE. The TCP rate mechanism adjusts the rate by manipulating the UE's RWS and providing the intelligence to alters the Iub/S1 packet transparently.

Advantages

In summary the invention includes the following advantages aspects:

The symmetric IGW distributed over the Iub interface with IK/CK listener from the IuPS interface.
The IGW Architecture with cellular and optimization parts, see for example FIGS. 7 and 8, showing the options of the modules having the optimization functions or these beign external. FIG. 8 shows an open GTP interface to a WAN optimizer,
Common channel identity capture, allowing separate handling, such as for voice and data streams, as illustrated in FIG. 7.
The Iub Codec provides in various embodiments bandwidth optimization functions including FP filtering for avoiding sending some packets such as empty FP packets, FP latency tolerance by manipulation of the channel synchronization messages to cater for any additional latency between the IGW and RNC. Also, in some embodiments there is transparency on RLC retransmission.

The mechanism to build Iub context for decoding and deciphering the Iub.

Cipher procedure suppression.

GTP conversion for PP/FP/MAC/RLC parameters mapped onto GTP header, and/or multiple IP packets over single GTP, and/or partial IP packet over single GTP.

Routing radio bearer per Iub context.

Bandwidth optimization procedures.

The invention is not limited to the embodiments described but may be varied in construction and detail.

The invention claimed is:

1. A gateway comprising digital data processors and communication links adapted to provide:
   a central module for interfacing with a core network element;
   a remote module for interfacing with a remote base station;
   wherein said central module and remote module are adapted to provide communication between the core network element and the remote base station, at least one of the central module and the remote module is adapted to perform tunnel multiplexing, packet compression, stream de-duplication, and header compression, and each of the central module and the remote module is adapted to perform the following:
      detect a first encrypted data channel and signalling channels used for communicating with the other one of the central module and the remote module;
      extract encrypted data traffic from the first encrypted data channel without affecting the signalling channels, and decrypt a portion of the encrypted data traffic to produce decrypted data traffic;
      perform conversion of the decrypted data traffic to a format suitable for optimization to reduce bandwidth required, perform said optimization to produce optimized data, and transmit the optimized data; and
      receive optimized data from the other one of the central module and the remote module and re-constitute a second encrypted data channel.

2. A gateway as claimed in claim 1, wherein the conversion is performed transparently to the core network element and to the remote base station.

3. A gateway as claimed in claim 2, wherein the modules are adapted to detect data and voice channels and to perform different actions on them.

4. A gateway as claimed in claim 3, wherein the modules are adapted to allow voice pass through with no conversion or optimisation, while diverting data streams for conversion and optimization.

5. A gateway as claimed in claim 4, wherein data streams are encapsulated into a tunnelling protocol and are processed by optimization functions to reduce bandwidth.

6. A gateway as claimed in claim 5, wherein the channel detection is performed by a package switch radio bearer function.

7. A gateway as claimed in claim 6, wherein the gateway includes an Interface Universal Mobile Telecommunications Systems (UMTS) connection Radio Network Controller (RNC) and NodeB interface (IUB Interface) configured to transmit signalling between the core network element and the remote base station.

8. A gateway as claimed in claim 7, wherein the core network element is an RNC.

9. A gateway as claimed in claim 8, wherein the remote base station is a NodeB.

10. A gateway as claimed in claim 9, wherein the modules include tunnel multiplexer functions to optimize the data streams.

11. A gateway as claimed in claim 10, further comprising plural remote modules, wherein the central module communicates with the plural remote modules.

12. A gateway as claimed in claim 11, wherein the modules are further adapted to extract the encrypted data traffic from the first encrypted data channel to produce the decrypted data traffic including clear packets suitable for stream de-duplication.

13. A gateway as claimed in claim 12, wherein the modules are further adapted to perform the stream de-duplication using the clear packets extracted from the encrypted data traffic to produce de-duplicated traffic, and the modules are further adapted to re-constitute the first encrypted data channel by encrypting the de-duplicated traffic.

14. A gateway as claimed in claim 13, wherein the modules are adapted to monitor signalling and to establish a conversion context in real time according to the monitored signalling.

15. A gateway as claimed in claim 14, wherein the modules maintain in real time tables for controlling how interface stream detection and conversion are performed.

16. A gateway as claimed in claim 15, wherein at least one module is adapted to communicate with elements external to the interface in order to determine information for conversion.

17. A gateway as claimed in claim 16, wherein at least one module is adapted to communicate with a core network element on a side opposed to the interface.

18. A gateway as claimed in claim 17, wherein the module is adapted to retrieve a key from an Interface Universal Mobile Telecommunications Systems (IU interface) on a core network element such as an RNC in order to establish a context.

19. A gateway as claimed in claim 18, wherein a module is adapted to obtain a CMD ID and a SEC M CMD.

20. A gateway as claimed in claim 19, wherein the modules are adapted to suppress ciphering according to monitoring of signalling on the interface.

21. A gateway as claimed in claim 20, wherein the modules are adapted to monitor protocol headers for conversion to a desired protocol such as a tunnelling protocol.

22. A gateway as claimed in claim 21, wherein the modules are adapted to convert headers to session ID format for bandwidth optimization.

23. A gateway as claimed in claim 22, wherein the interface includes an LTE capability.

24. A gateway as claimed in claim 23, wherein the modules are similar in capability, differing substantively only in capacity, providing a symmetrical architecture.

25. A gateway as claimed in claim 24, wherein at least one module is adapted to perform spoofing, by not sending some packets and equivalent packets being generated by the other module.

26. A gateway as claimed in claim 25, wherein said packets are empty FP packets.

27. A gateway as claimed in claim 26, wherein the modules are adapted to perform latency tolerance operations.

28. A gateway as claimed in claim 27, wherein the modules are adapted to delay channel synchronisation signals to maintain overall frame synchronisation even where the modules may themselves introduce additional latency and jitter.

29. A gateway as claimed in claim 28, wherein the channel synchronization signals are delayed by to increase the latency as perceived by the sending entity to provide the modules with additional processing time to transmit data within its scheduled time window.

30. A gateway as claimed in claim 29, wherein at least one module is adapted to identify parameters to determine a current network state, and to use said parameters to manage bandwidth of optimized streams.

31. A gateway as claimed in claim 30, wherein said module is further adapted to identify per-flow and per-subscriber parameters and uses said parameters to optimize the data streams.

32. A gateway as claimed in claim 30, wherein at least one module is adapted to throttle data transmission on a per-subscriber basis in response to said monitoring.

33. A gateway as claimed in claim 30, wherein the throttling is performed by adjustment of a TCP window size.

34. A gateway as claimed in claim 30, wherein said module is further adapted to extract security parameters.

35. A gateway as claimed in claim 30, wherein at least one module is adapted to build a database with per-subscriber usage records, and to implement per-subscriber data streaming according to said records.

36. A gateway as claimed in claim 30, wherein said module is further adapted to monitor Iub/S1 links in an interceptor.

37. A non-transitory computer readable medium comprising software code adapted to perform operations of a gateway according to claim 1 when executing on a digital processor.

* * * * *